Patented Sept. 18, 1934

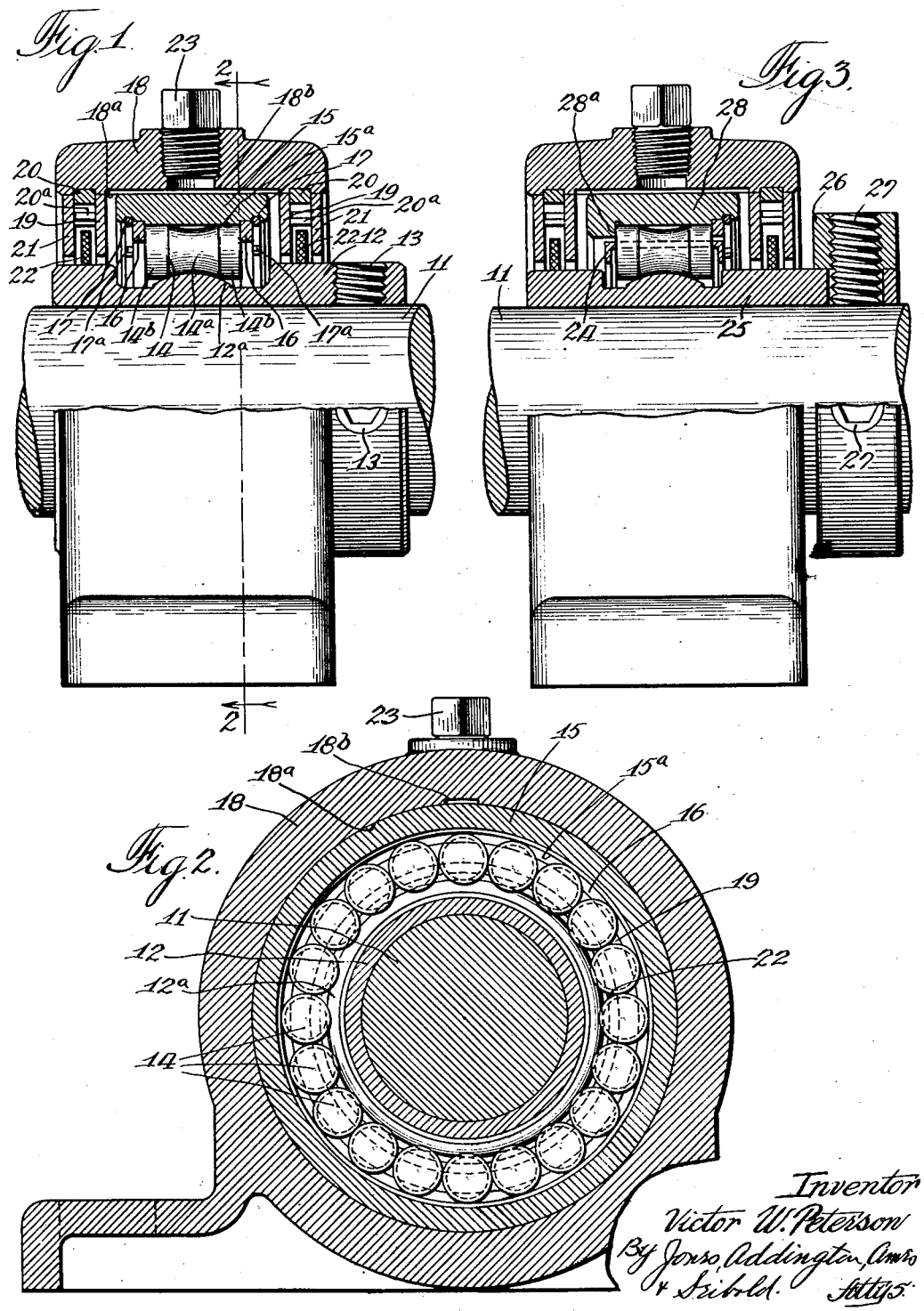

1,973,994

UNITED STATES PATENT OFFICE 1,973,994

ANTIFRICTION BEARING

Victor W. Peterson, Chicago, Ill., assignor to Shafer Bearing Corporation, Chicago, Ill., a corporation of Illinois Application December 21, 1932, Serial No. 648,172

8 Claims. (Cl. 308—207)

This invention relates to antifriction bearings and has particular relation to a novel type of self-aligning roller bearing and also to the structure of the bearing support or housing used in combination therewith.

The primary object of the invention is to provide a new and improved type of self-aligning roller bearing which is peculiarly adapted for carrying radial loads, although also capable of carrying limited thrust loads.

Another object of the invention is to provide a bearing of the above-indicated character and a mounting therefor which will be particularly economical to produce.

There is a distinct need in the art for a moderately priced, self-aligning bearing for application to a variety of industrial machines, conveyors, material handling equipment and the like. Most of these applications require a self-aligning bearing due to inaccuracies in machining and assembly and because of shaft deflection under load, as well as because of instability of structural iron framework such as is commonly employed in the construction of such equipment. Most of the loads encountered in these applications are comparatively light, yet in many cases intermittent shock loads are encountered. The use of ball bearings in such applications is subject to the disadvantage that such bearings do not have a high shock load capacity, with the result that it is frequently necessary to use a bearing of a larger size than would be required for the normal load in order to take care of the shock load. It is also necessary to use a comparatively expensive bearing in order to obtain self-alignment. The same is true of roller bearings heretofore used for such applications.

The above-mentioned disadvantages of the bearings now in use are entirely overcome by the present invention, which combines the principal advantages of each of the several types of bearings heretofore used for applications of the above-indicated character.

The above and other objects and advantages of the present invention will appear from a consideration of the following detailed description of certain preferred embodiments of the invention, taken in conjunction with the illustration of said embodiments in the accompanying drawing, in which:

Figure 1 is a view, partly in side elevation and partly in vertical section, of a preferred embodiment of the invention;

Fig. 2 is a transverse sectional view of the same construction taken on a plane indicated by the line 2—2 in Fig. 1; and Fig. 3 is a view similar to Fig. 1, but illustrating certain modifications of the invention, any one or more of which may be used, as desired.

Referring first to Figs. 1 and 2 of the drawing, a shaft 11 is shown as being carried by a roller bearing and pillow block constructed in accordance with the invention. The roller bearing comprises an inner bearing member 12, which is in the nature of a sleeve fitting onto the shaft 11 and secured thereto by set screws 13, 13 received in screw-threaded openings in a projecting end portion of the said inner bearing member 12. This inner bearing member is formed with a bearing surface 12a which is substantially spherically curved, although preferably deviating slightly from exact sphericity in a manner and for a purpose hereinafter set forth.

Bearing rollers 14 coact between the inner bearing member 12 and an outer bearing member 15, each of these rollers having an intermediate concave-surfaced portion 14a bearing upon the substantially spherically curved bearing surface 12a of the inner bearing member 12. The radius of the longitudinal curvature of these intermediate portions of the bearing rollers is preferably struck from the exact geometric center of the bearing surface 12a, while the longitudinal curvature of said surface 12a has a very slightly shorter radius, whereby the proper contact between the rollers and the inner bearing member is secured when the bearing is operating under load, although the present invention is not limited to this feature. In any event, the curvature of the bearing surface 12a is such as to provide a perfectly self-aligning bearing.

Each of the rollers 14 also comprises substantially cylindrical spaced portions 14b at the opposite ends of said rollers. These portions of the rollers bear against an internal cylindrical bearing surface 15a of the outer bearing member 15, but do not contact with the inner bearing member. The intermediate concave-surfaced portions 14a of the rollers likewise do not contact with the outer bearing member 15. The rollers 14 are held against skewing and against longitudinal displacement with respect to the outer bearing member 15 by hardened and ground thrust rings 16, 16 which are carried in counterbored recesses at the opposite ends of the outer bearing member 15 and which project inwardly into the bore of the outer member 15 beyond the bearing surface 15a thereof.

The spacing between the inner faces of these two thrust rings 16 is substantially equal to the length of the rollers 14, so that substantially no clearance, or only enough to permit free running of the rollers, is permitted between said rollers and the thrust rings. The thrust rings 16 are held in the outer bearing member 15 by means of locking rings 17, 17, respectively, which are preferably made of resilient metal and split as indicated at 17a so that they may be inserted in annular grooves in the internal surface of the outer bearing member 15 near the respective ends thereof, as shown. The locking rings 17 project inwardly beyond the outside diameter of the thrust rings 16, so that the latter are securely held in place in the outer bearing member 15.

The outer bearing member 15 is received in the cylindrical bore 18a of a pillow block 18 or other suitable type of housing or bearing support. The diameter of the bore 18a is such as to permit the outer bearing member 15 to slide freely therein without radial play, and the construction is preferably, although not necessarily, such that a limited amount of such sliding action is permitted. The extent of this movement, when provided for, is limited by thrust washers 19, 19, which are pressed into the bore 18a of the pillow block 18. These thrust washers are held against outward displacement by locking rings 20, 20, respectively, which are preferably made of resilient metal and split as indicated at 20a so that they may be inserted in annular grooves in the internal surface of the pillow block housing 18, as illustrated. It will be seen that the extent of sliding movement of the outer bearing member 15 in the bore 18a of the housing is limited by the thrust washers 19, with which the ends of the outer bearing member 15 come in contact when the permissible amount of movement has taken place.

The thrust washers 19 perform a dual function in that each of them also constitutes a part of a labyrinth lubricant seal. The remainder of the seal at each end of the pillow block housing is constituted by an outer washer 21 and an intermediate washer 22. The outer washers 21, 21 are similar to the thrust washers 19, 19 and are likewise pressed into the bore of the housing. The inner faces of these washers engage the outer faces of the locking rings 20, 20, whereby the outer washers are spaced from the thrust washers 19, 19.

The intermediate washers 22, 22 are carried by the end portions of the inner bearing member 12 and project outwardly therefrom between the washers 19, 19 and 21, 21 and in spaced and overlapping relation thereto to provide a labyrinth arrangement which effectively prevents the escape of grease or other heavy lubricant customarily used for bearings of this type. The intermediate washers 22, 22 are preferably made of fiber and are fitted snugly onto the inner bearing member 12, so that they normally rotate therewith. The washers 19 and 21 are preferably of metal, particularly the thrust washers 19, which should be made of steel to take the thrust of the outer bearing member 15 when the latter comes into contact therewith.

Lubricant is supplied to the bearing through the usual opening at the top of the housing, which opening is normally closed by a screw-threaded plug 23. A longitudinal channel 18b is formed in the internal surface of the housing to extend the lubricant supply opening outwardly beyond one or both ends of the outer bearing member 15, so that lubricant may be freely supplied to the bearing inside the housing.

The bearing illustrated in Figs. 1 and 2 is of the full roller type, in which the cylindrical end portions 14b of adjacent rollers come into tangential contact with each other, so that no retainer is required. The present invention, however, is equally applicable to bearings of the retainer type utilizing spaced rollers, and the construction illustrated in Fig. 3 is of this type, a retainer 24 being illustrated.

Another modification illustrated in Fig. 3 is constituted by the means for securing the inner bearing member to the shaft. In this construction an inner bearing member 25 having somewhat thinner end portions is utilized and the end portion which projects beyond the pillow block housing or the like is surrounded by a collar member 26 having screw-threaded openings therein for the reception of set screws 27. This projecting end portion of the inner bearing member 25 is provided with unthreaded openings of sufficient size to permit the passage of set screws 27 therethrough, and these openings have the same angular displacements as the openings in the collar member 26, so that the set screws pass through said openings to engage the shaft 11.

In most instances the inner bearing member may be made with end portions of sufficient thickness to enable the set screws to be threaded directly into the same, as illustrated in Fig. 1, but the construction modified in this respect, as shown in Fig. 3, may be found to be more advantageous in some cases.

Another modified feature illustrated in Fig. 3 lies in the construction of the outer bearing member. Said outer bearing member in this modification is designated by the reference character 28 and comprises an integral, inwardly-extending, annular shoulder portion 28a taking the place and performing the function of the previously described thrust ring 16 and locking ring 17 at one end of the bearing. While this modified construction thus eliminates two parts, it has been found that the construction of Fig. 1 is somewhat easier to manufacture, and the construction of Fig. 1 is therefore regarded as preferable at the present time.

In all other respects the construction illustrated in Fig. 3 is similar to that of Fig. 1. It will be understood that the construction of Fig. 1 may be utilized without any of the modifications referred to, or that any one or more of such modifications may be incorporated in said construction.

In the use of a bearing of the type described above, a self-aligning action is obtained by reason of the substantially spherical curvature of the bearing surface of the inner bearing member, thus accommodating all ordinary degrees of misalignment between the shaft and the bearing support. This feature is of great importance in applications of the type hereinbefore mentioned, since such misalignment is particularly common in applications of those types. This type of bearing also has a marked advantage because of its large shock load capacity, as compared with ball bearings, which have been commonly employed in the past for applications of this sort.

While the bearing has been primarily designed for carrying radial loads, it is also adapted to sustain limited thrust loads, and pillow block construction herein illustrated and described shows the manner in which the carrying of thrust loads may be provided for. It will be seen that the thrust rings 16, 16 prevent longitudinal movement between the rollers and the outer bearing member 15, so that the rollers and the outer bearing member are moved as a unit with the inner bearing member upon any axial movement of the latter. The extent of this movement is limited by the spacing of the thrust washers 19, 19 carried by the pillow block housing, and when the outer bearing member 15 comes into contact with either of these thrust washers the thrust load is taken by said washer and further axial movement of the bearing in this direction is prevented. The spacing of the thrust washers 19, 19 is sufficiently greater than the length of the outer bearing member 15 to accommodate all necessary play and all variations in shaft length resulting from expansion and contraction due to changes in temperature.

The lubricant seal construction is peculiarly suited to this type of bearing since it accommodates changes in the relative positions of the bearing unit and its support, due either to misalignment or to longitudinal movement of the shaft relative to the pillow block or other bearing support. The spacing between the intermediate washers 22 and the thrust washer 19 and outer washer 21 at the corresponding end of the housing is sufficient to accommodate the ordinary longitudinal movement of the shaft relative to the bearing support, but in the event of a greater movement the intermediate washer may be forced inwardly or outwardly a slight distance on the cylindrical end portions of the inner bearing member.

The spacing of the washers is also sufficient to take care of all ordinary degrees of misalignment without contact between the intermediate washers and the thrust washers or outer washers, but in the event such contact does occur it will do no harm. It is for this reason that the intermediate washers 22, 22 are preferably made of fiber, while the thrust washers 19, 19 and outer washers 21, 21 are ordinarily made of metal. The intermediate washers 22, 22 normally rotate with the inner bearing member 12, but, in case of substantial frictional contact between the intermediate washers and the thrust washers or outer washers, such rotation may be arrested thereby. This condition is not objectionable, however, as the inner bearing member will simply rotate within the intermediate washers 22, and the material of which these intermediate washers are made is sufficiently soft to permit such relative rotation without damaging the inner bearing member. In the event that the intermediate washers become excessively worn, it is, of course, a simple and inexpensive matter to replace them.

From the foregoing, it will be seen that the present invention provides a bearing construction and support therefor having marked advantages for numerous types of installations. It will be understood that various changes and modifications other than those herein described may be made in the details of design and arrangement of parts without departing from the spirit and scope of the invention, and that various bearing supports other than pillow blocks, such, for example, as journal boxes, integral machine housings, and the like, may be constructed in accordance with the invention.

What is claimed as new and is desired to secure by Letters Patent, therefore, is:

1. A self-aligning antifriction bearing capable of carrying both radial and thrust loads, comprising an outer bearing member having an internal cylindrical bearing surface, an inner bearing member having a substantially spherically curved external bearing surface, and a plurality of bearing rollers cooperating between said bearing members, each of said rollers having spaced cylindrical portions bearing on said cylindrical bearing surface of said outer bearing member and an intermediate concave-surfaced portion bearing on said substantially spherically curved bearing surface of said inner bearing member but not contactive with said outer bearing member, and means for preventing relative longitudinal movement between said rollers and said outer bearing member, whereby thrust loads may be sustained.

2. A self-aligning antifriction bearing capable of carrying both radial and thrust loads, comprising an outer bearing member having an internal cylindrical bearing surface, an inner bearing member having a substantially spherically curved external bearing surface, and a plurality of bearing rollers cooperating between said bearing members, each of said rollers having spaced cylindrical portions bearing on said cylindrical bearing surface of said outer bearing member and an intermediate concave-surfaced portion bearing on said substantially spherically curved bearing surface of said inner bearing member but not contactive with said outer bearing member, and means carried by said outer bearing member and contactive with the ends of said bearing rollers for preventing relative longitudinal movement between said rollers and said outer bearing member, whereby thrust loads may be sustained.

3. A self-aligning antifriction bearing capable of carrying both radial and thrust loads, comprising an outer bearing member having an internal cylindrical bearing surface, an inner bearing member having a substantially spherically curved external bearing surface, and a plurality of bearing rollers cooperating between said bearing members, each of said rollers having spaced cylindrical portions bearing on said cylindrical bearing surface of said outer bearing member and an intermediate concave-surfaced portion bearing on said substantially spherically curved bearing surface of said inner bearing member but not contactive with said outer bearing member, and spaced thrust rings carried by said outer bearing member and projecting inwardly beyond said bearing surface thereof and contactive with respective ends of said rollers for preventing relative longitudinal movement between the latter and said outer bearing member, whereby thrust loads may be sustained.

4. A self-aligning antifriction bearing capable of carrying both radial and thrust loads, comprising an outer bearing member having an internal cylindrical bearing surface, an inner bearing member having a substantially spherically curved external bearing surface, and a plurality of bearing rollers cooperating between said bearing members, each of said rollers having spaced cylindrical portions bearing on said cylindrical bearing surface of said outer bearing member and an intermediate concave-surfaced portion bearing on said substantially spherically curved bearing surface of said inner bearing member but not contactive with said outer bearing member, spaced thrust rings carried by said outer bearing member and projecting inwardly beyond said bearing surface thereof and contactive with the respective ends of said rollers for preventing relative longitudinal movement between the latter and said outer bearing member, and locking rings fitting into annular grooves in the internal surface of said outer bearing member and engaging said thrust rings for preventing longitudinal displacement of the latter relative to said outer bearing member, whereby thrust loads may be sustained.

5. An antifriction bearing and pillow block or the like, comprising a housing having a bore therein for receiving said bearing, an outer bearing member fitting within said bore in longitudinally slidable relation and having an internal cylindrical bearing surface, means for limiting such longitudinal sliding movement of said outer bearing member, an inner bearing member having a substantially spherically curved external bearing surface, bearing rollers cooperating between said outer and inner bearing members and having spaced cylindrical portions bearing on said cylindrical bearing surface of said outer bearing member and concave-surfaced portions bearing on said substantially spherically curved surface of said inner bearing member but not contactive with said outer bearing member, whereby a self-aligning action of the bearing is accommodated, and means for preventing relative longitudinal movement between said bearing rollers and said outer bearing member, whereby said rollers and outer bearing member are moved as a unit with said inner bearing member upon any axial movement of the latter, with said outer bearing member sliding to a limited extent in the bore of the housing.

6. An antifriction bearing and pillow block or the like, comprising a housing having a bore therein for receiving said bearing, an outer bearing member fitting within said bore in longitudinally slidable relation and having an internal cylindrical bearing surface, spaced thrust washers carried by said housing and projecting into said bore thereof for limiting such longitudinal sliding movement of said outer bearing member, locking rings fitting into annular grooves in the internal surface of said housing and engaging said thrust washers for preventing displacement of the latter relative to said housing, an inner bearing member having a substantially spherically curved external bearing surface, bearing rollers cooperating between said outer and inner bearing members and having spaced cylindrical portions bearing on said cylindrical bearing surface of said outer bearing member and concave-surfaced portions bearing on said substantially spherically curved surface of said inner bearing member but not contactive with said outer bearing member, whereby a self-aligning action of the bearing is accommodated, and means for preventing relative longitudinal movement between said bearing rollers and said outer bearing member, whereby said rollers and outer bearing member are moved as a unit with said inner bearing member upon any axial movement of the latter, with said outer bearing member sliding in the bore of the housing to an extent limited by said thrust washers.

7. An antifriction bearing and pillow block or the like, comprising a housing having a bore therein for receiving said bearing, an outer bearing member fitting within said bore in longitudinally slidable relation and having an internal cylindrical bearing surface, spaced thrust washers carried by said housing and projecting into said bore thereof for limiting such longitudinal sliding movement of said outer bearing member, an inner bearing member having a substantially spherically curved external bearing surface, bearing rollers cooperating between said outer and inner bearing members and having spaced cylindrical portions bearing on said cylindrical bearing surface of said outer bearing member and concave-surfaced portions bearing on said substantially spherically curved surface of said inner bearing member but not contactive with said outer bearing member, whereby a self-aligning action of the bearing is accommodated, means for preventing relative longitudinal movement between said bearing rollers and said outer bearing member, whereby said rollers and outer bearing member are moved as a unit with said inner bearing member upon any axial movement of the latter, with said outer bearing member sliding in the bore of the housing to an extent limited by said thrust washers, outer washers carried by said housing and projecting into said bore thereof in outwardly spaced relation to said thrust washers, and intermediate washers carried by said inner bearing member and projecting outwardly therefrom in spaced relation between said thrust washers and outer washers to provide labyrinth lubricant seals accommodating both the longitudinal sliding action and self-aligning action of the bearing.

8. An antifriction bearing and pillow block or the like, comprising a housing having a bore therein for receiving said bearing, an outer bearing member fitting within said bore in longitudinally slidable relation and having an internal cylindrical bearing surface, spaced thrust washers carried by said housing and projecting into said bore thereof for limiting such longitudinal sliding movement of said outer bearing member, locking rings fitting into annular grooves in the internal surface of said housing and engaging said thrust washers for preventing displacement of the latter relative to said housing, an inner bearing member having a substantially spherically curved external bearing surface, bearing rollers cooperating between said outer and inner bearing members and having spaced cylindrical portions bearing on said cylindrical bearing surface of said outer bearing member and concave-surfaced portions bearing on said substantially spherically curved surface of the inner bearing member but not contactive with said outer bearing member, whereby a self-aligning action of the bearing is accommodated, means for preventing relative longitudinal movement between said bearing rollers and said outer bearing member, whereby said rollers and outer bearing member are moved as a unit with said inner bearing member upon any axial movement of the latter, with said outer bearing member sliding in the bore of the housing to an extent limited by said thrust washers, outer washers carried by said housing in inwardly projecting relation to said bore thereof and spaced outwardly from said thrust washers by said locking rings, and intermediate washers carried by said inner bearing member and projecting outwardly therefrom in spaced relation between said thrust washers and outer washers to provide labyrinth lubricant seals accommodating both the longitudinal sliding action and self-aligning action of the bearing.

VICTOR W. PETERSON.